United States Patent [19] [11] 3,990,750
Tanguy et al. [45] Nov. 9, 1976

[54] ELECTRONIC ANTISKID BRAKING CONTROL UNIT

[75] Inventors: Christian Tanguy, Frepillon; Guy Marouby, Neuilly, both of France

[73] Assignee: Societe Anonyme D.B.A., Paris, France

[22] Filed: July 11, 1975

[21] Appl. No.: 594,982

[30] Foreign Application Priority Data

Aug. 1, 1974  France .............................. 74.26727

[52] U.S. Cl. .......................... 303/21 BE; 188/181 C
[51] Int. Cl.² .......................................... B60T 8/10
[58] Field of Search ............ 188/181 C; 303/20, 21,
303/106, 109; 307/10 R; 317/5; 324/161;
340/53, 62

[56] References Cited
UNITED STATES PATENTS 3,804,470   4/1974   Slavin et al. ..................... 303/21 BE
3,811,739   5/1974   Nakamura et al. ............. 303/21 BE
3,883,187   5/1975   Carp et al. ......................... 303/21 P
3,912,340   10/1975  Bertolasi ......................... 303/21 BE

*Primary Examiner*—Stephen G. Kunin
*Attorney, Agent, or Firm*—Ken C. Decker

[57] ABSTRACT

An electronic antiskid control unit for an adaptive braking system of the speed reference type wherein a signal for controlling decay of pressure is generated in response to comparison of the wheel speed signal with another signal. In a first phase, the wheel speed signal is compared with a reference signal derived from the wheel speed signal for generating the decay signal as long as the wheel speed reference signal is greater than wheel speed signal. At the end of this first phase, the wheel speed and speed reference signals have the same value and the speed reference signal is overridden by another increasing signal for comparison with the wheel speed signal thereby increasing duration of the decay. The other signal has three portions and is derived from a base signal having an exponential characteristic. At the end of the third portion, corresponding to intersection of the other signal with the wheel speed signal, the decay signal is extinguished.

12 Claims, 3 Drawing Figures

3,990,750

ELECTRONIC ANTISKID BRAKING CONTROL UNIT

The invention relates to an electronic antiskid control unit for an adaptive braking system, and more particularly to a control unit adapted to be used in an adaptive braking system of the so-called speed reference type.

Various electronic control units have been proposed, in which, for example, the signal representative of wheel speed is permanently compared with a reference signal being normally offset by a predetermined amount below the wheel speed signal, but having a rate of decrease limited to a maximum value so that when a sharp deceleraion occurs, the reference signal cannot follow the wheel speed signal and their respective representative curves intersect, thereby switching the comparator for controlling decay of pressure in the brake actuators until the wheel speed signal is again over the speed reference signal.

It has also been proposed to initiate the decay signal in response to comparison of the wheel speed signal with a speed reference signal in the same manner as above mentioned, an increasing exponential signal with an initial value equal to zero and an asymptotic value equal to the instant value of the wheel speed or wheel speed reference signals being generated at the beginning of the decay signal, said decay signal being terminated in response to the second intersection of the wheel speed signal and the exponential signal.

Although these systems operate rather satisfactorily, it has appeared desirable to design a new electronic control unit for determining with more accuracy the optimum instant for termination of the decay signal.

Therefore the invention proposes an electronic antiskid braking control unit for a vehicle braking system for delivering signals adapted to control modulation of the braking pressure in at least one brake actuator of a monitored wheel of the vehicle, said control unit comprising means for supplying a wheel speed voltage whose level is representative of the rotational speed of the monitored wheel, means for supplying a wheel speed reference voltage derived from said wheel speed voltage, comparing means having a first and a second input said first input receiving said wheel speed voltage, for generating a signal for controlling the decay of pressure in the brake actuator when the signals applied at the first and second inputs of the comparing means bear a predetermined relationship, means for generating a further voltage signal comprising first, second and third portions, said first portion coinciding with a base signal as long as the difference between the base signal and the wheel speed signal is less than a predetermined value, said second portion being offset with said wheel speed signal by said predetermined value and terminated when a predetermined condition is reached, said third portion being delayed by a predetermined amount with respect to said base signal, said third portion being terminated when the value of the latter becomes equal to the value of the wheel speed voltage, switching means for normally applying said wheel speed reference voltage to said second input of the comparing means, said wheel speed reference voltage at said second input being substituted by the first second and third portions of said further voltage signal when the latter are generated.

In the particular described embodiment of the electronic control unit, the base signal is an exponential signal having an initial value equal to the instantaneous value of the wheel speed reference signal, and an asymptotic value equal to the value of the wheel speed reference signal at the beginning of the decay signal.

The inventinn will now be described, by way of example with reference to the accompanying drawings wherein.

Figure 1:
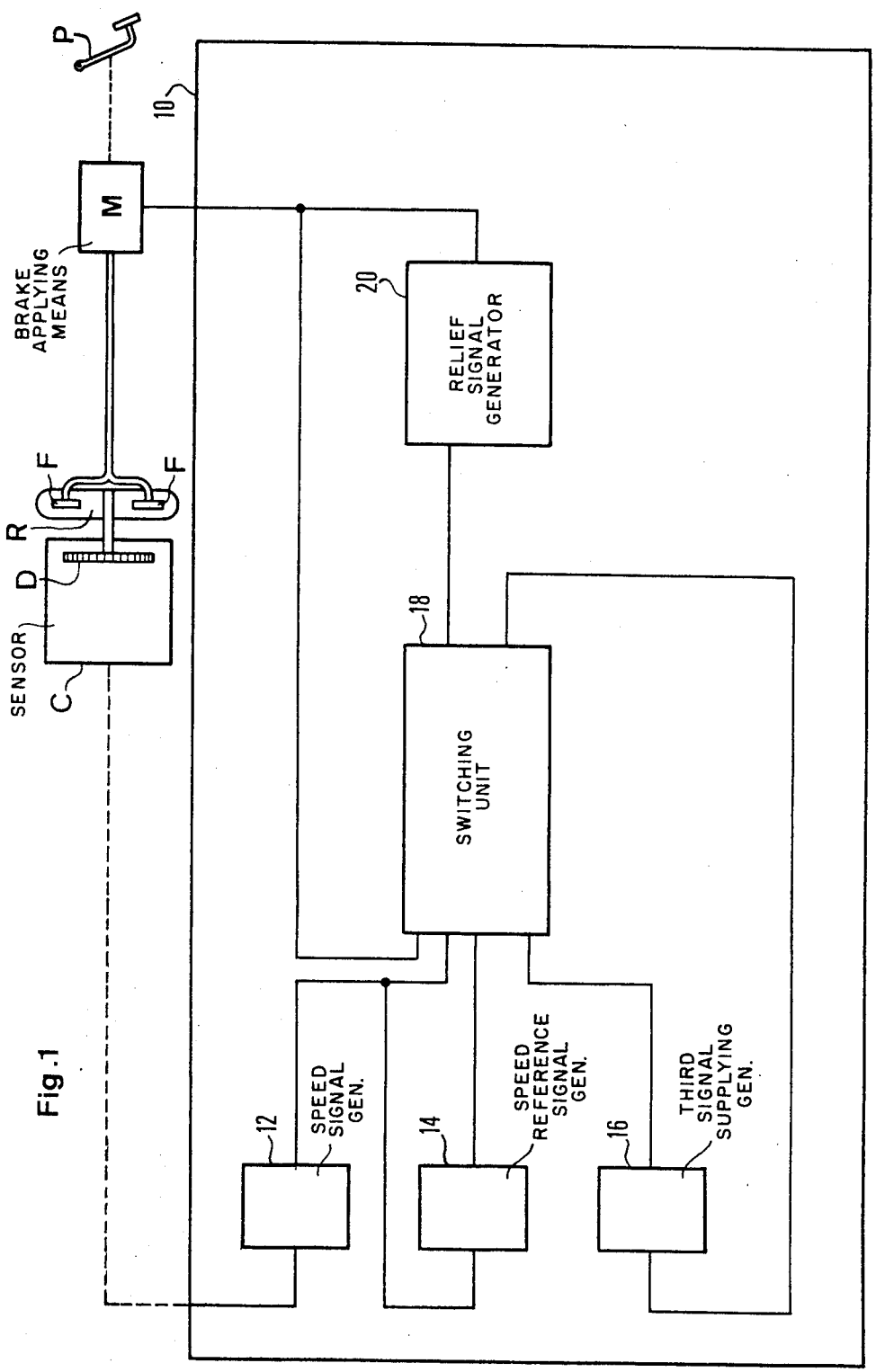
FIG. 1 illustrates diagrammatically an electronic braking system embodying the invention.

FIG. 1 is a diagram representing a braking circuit according to the invention. An electromagnetic sensor C with a serrated disc D attached to one wheel R of a vehicle supplies a signal whose frequency at an instant is proportional to the rotational speed of the wheel R. An electronic unit 10 is designed to supply brake applying means M, operated by a pedal P, with a signal to relieve the pressure applied by these means M to brakes F acting on the wheel R. The electronic unit 10 has a speed signal generator 12 which receives the signal from the sensor and which delivers a d-c signal whose amplitude is proportional to the speed of the wheel R, at its output. This generator 12 is a frequency-to-voltage converter. The electronic unit 10 includes, in addition to the speed signal generator 12, a speed reference signal generator 14 for supplying a signal V2 and another generator 16 for supplying a third signal. Operation of the two generators 14 and 16 will be explained in detail below. A switching unit 18 receives the respective signals from the generator 12, the speed reference signal generator 14 and the other generator 16. The switching unit 18 selects the signals to supply to a relief signal generator 20, whose output signal is also the output signal of the electronic unit 10. The output of the relief signal generator 20 is also connected to one input of the switching unit 18. In addition the switching unit 18 can supply a control signal to the input of the generator 16.

The electronic control unit 10 will now be described in detail with reference to FIG. 2. It comprises the generator 12 supplying a voltage V1 representing the speed of the monitored wheel. The output of the generator 12 is connected to the input of the speed reference signal generator 14, i.e. connected to the positive input terminal of an operational amplifier 22. The output of the operational amplifier 22 is connected to the anode of a diode 24, whose cathode is connected to one plate 25 of a capacitor 26. The other plate of the capacitor 26 is earthed. The junction to the diode 24 and capacitor 26 is connected directly to the negative input terminal of the operational amplifier 22 and by way of a diode 28 to the positive input terminal of the amplifier 22. The cathode of the diode 24 is connected to the positive input terminal of an operational amplifier 32 by a resistor 30. The output of the operational amplifier 32, which is also the output of the generator 14, is connected directly to the negative input terminal of the amplifier 32 and by way of a resistor 34 to the positive input terminal of the operational amplifier 32. It is assumed that in an initial operating condition the voltage V1 representing the speed of the wheel R increases or remains constant and the output voltage V2 of the generator 14 equals the voltage representing the speed of the monitored wheel less the voltage drop in the resistor 30. This voltage drop is constant, since the constant bias voltage of the amplifier 32 imposes a constant current through the resistor 34 and therefore through the resistor 30. This given value of the current in the resistors 30, 34 determines the maximum decay rate in the charge of the capacitor 26, through the said resistors when the rate of decrease of V1 is less than the maximum decay rate of the voltage at the terminals of the capacitor 26 permitted by the constant-current sink formed by the resistors 30, 34. If, however, V1 decreases faster than the voltage at the terminals of the capacitor 26 is allowed to decrease, the result is that the voltage at the terminals of the capacitor 26 gradually becomes equal to and then greater than the voltage V1. The diode 28 connected between the positive and negative input terminals of the operational amplifier 22 then prevents the voltage difference between the plate 25 of the capacitor 26 and the positive input of the amplifier 22 from becoming greater than the voltage drop of the diode 28. Consequently, the voltage V2 varies in the same way as the voltage at the terminal 25 of the capacitor 26. If V1 again begins to decrease more slowly than the voltage at the terminals of the capacitor 26 during the discharge to the resistors 30, 34, the voltage difference between the voltage at the terminal 25 and V1 becomes less than the direct voltage drop in the diode 28, and at an instant $t1$ the voltage V1 again exceeds the voltage V2.

Figure 2:
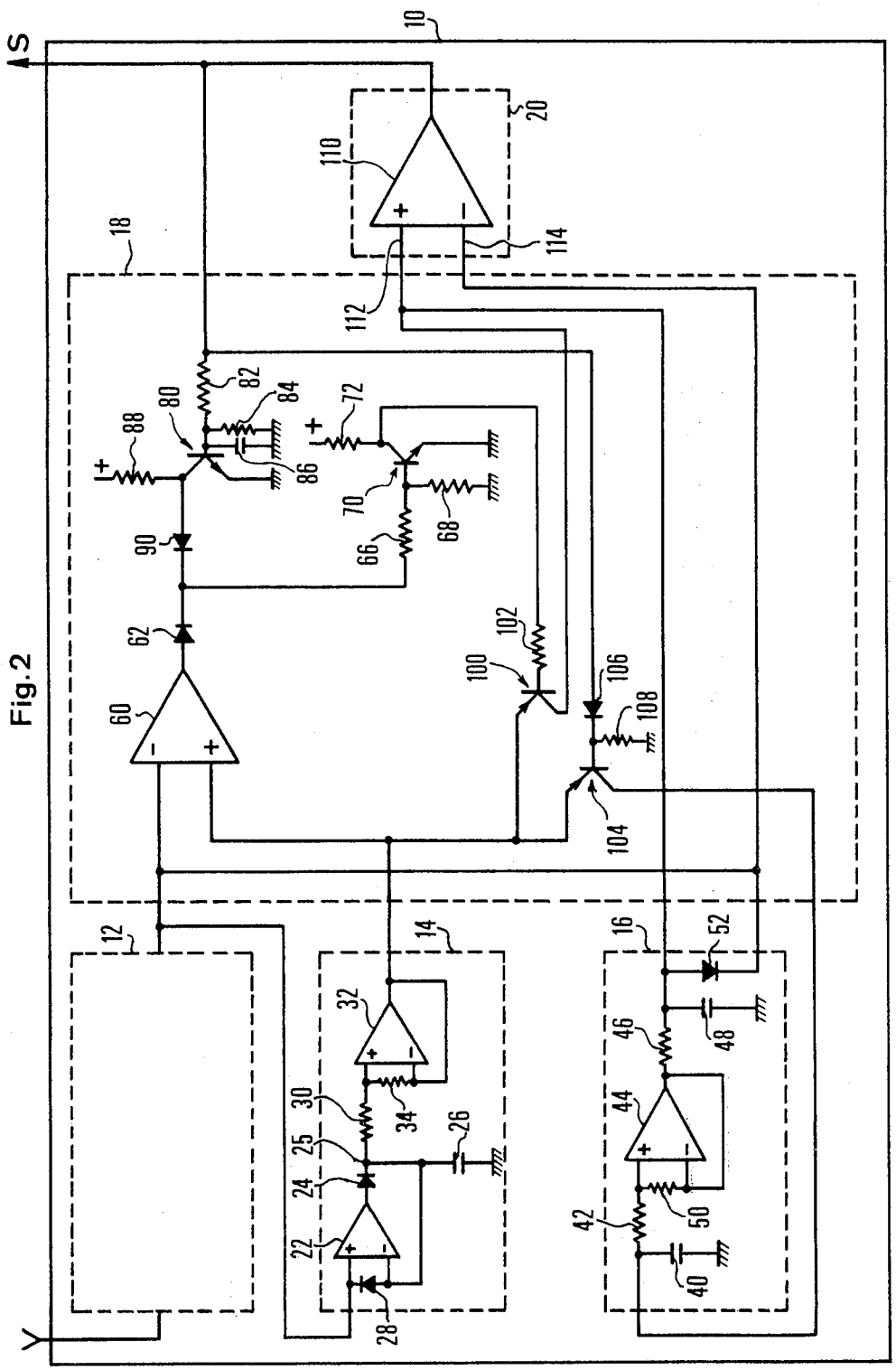
FIG. 2 is a more detailed circuit diagram of the electronic control unit of the adaptive braking system according to the invention.

In the embodiment of the electronic control unit illustrated in FIG. 2, the generator 16 has an input terminal formed by one plate of a capacitor 40 whose other plate is earthed. This capacitor is connected to the positive input terminal of an operational amplifier 44 by a variable resistor 42. A resistor 50 is connected between the positive and negative input terminals of the operational amplifier 44. The output terminal of the operational amplifier 44 is connected directly to the negative input of the amplifier 44. One terminal of a resistor 46 is connected to the output terminal of the operational amplifier 44, whereas its other end forms the output terminal of the generator 16. A capacitor 48 is connected between this other end of the resistor 46 and earth. At the output of the generator 16 a diode 52 is connected in the conductive direction between the output terminal of the generator 16 and the output terminal of the generator 12, with the result that the output voltage of the generator 16 is not allowed to exceed the voltage representing the speed of the wheel R by more than a value equal to the voltage drop of the diode 52. When the signal at the input terminal of the generator 16 is kept constant, the capacitor 48 charges exponentially but the voltage at its terminals never exceeds the voltage of the speed signal by more than the voltage drop of the diode 52.

The switching unit 18 has a comparator 60 of which the positive input terminal is connected to the output terminal of the speed reference signal generator, whereas its negative input terminal is connected to the output terminal of the generator 12. The output of the comparator 60 is connected to the anode of a diode 62, whose cathode is connected to the base of an NPN transistor 70 by way of a resistor 66. The base of the transistor 70 is earthed by way of a resistor 68 whereas its emitter is connected directly to earth, and its collector is connected to a high tension source by way of a resistor 72. The switching unit 18 also includes an NPN transistor 80 whose base is connected to the output terminal of the relief signal generator by way of a resistor 82 connected between the base of the transistor 80 and earth. A capacitor 86 connects the base of the transistor 80 to earth. The emitter of the transistor 80 is connected directly to earth, and its collector is connected to a high tension source by way of a resistor 88. The collector of the transistor 80 is also connected to the anode of a diode 90, whose cathode is connected to the cathode of the diode 62. The collector of the transistor 70 is connected to the base of a PNP transistor 100 by way of a resistor 102. The emitter of the transistor 100 is connected directly to the output terminal of the speed reference signal generator 14 and its collector is connected directly to an input terminal 112 of the relief signal generator 20. The output terminal of the relief signal generator 20 is connected to the base of a PNP transistor 104 by way of a diode 106, conductive from the output terminal of generator 20. A resistor 108 connects the base of the transistor 104 to earth. The emitter of the transistor 104 is connected directly to the output of the generator 14, and its collector is connected directly to the input capacitor of the generator 16.

The relief signal generator 20 is comprised of a comparator 110 with a positive input terminal 112 and a negative input terminal 114. The positive input terminal 112 is connected to both the collector of the transistor 100 and the output of the generator 16. The negative input terminal 114 is continuously connected to the output of the generator 12. The output signal of the comparator 110 is the relief signal fed to the brake applying means M previously mentioned in the description of FIG. 1.

Operation of the control unit which has just been described will now be explained with reference to FIGS. 2 and 3.

Initially the signal V1 is greater than the signal V2. The output signal of the comparator 60 is at a "low" level. The output signal of the comparator 110 is also at a "low" level and the transistor 80 is off. The collector of the transistor 80 is positive, which turns the transistor 70 on and the collector of the latter is now earthed with the result that the transistor 100 becomes conductive. The positive and negative input terminals of the comparators 60 and 100 therefore receive the same respective signals. At an instant $t_o$, at which the voltage V1 falls below the voltage V2, the output of the comparator 60 becomes positive and the transistor 70 remains conductive, as does the transistor 100. The comparator 110 then reacts in identical manner to the comparator 60, and its output switches to the "high" level at the instant $t_o$, so supplying the relief signal. The transistor 104, which was conductive until the instant $t_o$, turns off, and the capacitor 40 stores the value of the voltage V2 at the instant $t_o$. In reality the capacitor 40 discharges in the resistor 42, 50 in the same way as the capacitor 26 discharges to the resistors 30, 34, but the discharge time constant of the capacitor 40 is made sufficiently high relative to the duration of operation of an adaptive braking cycle to prevent a substantial reduction of the charge of capacitor 40 during operation of the device. If the voltage V1 again exceed the voltage V2 at an instant $t_1$, the output signal from the comparator 60 returns to a "low" level. The instant $t_1$ corresponds to the time at which the comparator 60 switches over, and consequently the transistor 100 is turned off, with the result that the input terminal 112 of the comparator 112 is supplied with the signal from the generator 16, this signal being equal at the instant $t_1$ to the wheel speed signal. It will be seen in the description that after $t_1$ the generator 16 tends to permanently to generate an exponential signal V3 which will be termed a base signal, but said generator actually delivers another signal having three portions and derived from said base signal.

During a first phase starting at $t_1$, the signal from the generator 16 coincides with the signal V3 having an initial value equal to wheel speed signal at $t_1$ and increasing exponentially. This exponential signal V3 increases towards an asymptotic value equal to the voltage stored in the capacitor 40, less the constant voltage drop in the resistor 42. The signal from the generator 16 coincides with the signal V3 until the instant $t3$ at which signal V3 is offset with respect to the wheel speed voltage by a constant voltage equal to the voltage drop in the diode 52.

During a second phase, from the instant $t3$, the signal from the generator 16 presents relative to the wheel speed signal a constant voltage offset equal to the voltage drop in the diode 52. It is therefore parallel to the wheel speed signal, but for each instant value of the signal from generator 16, it tends to resume an exponential trend identical to the base signal V3, with an initial gradient being the gradient of the base signal V3, at the time the latter passed by the instant value. It is prevented from doing so by the diode 52 as long as it tends to increase exponentially at a rate greater than the rate of increase of the wheel speed signal. This is illustrated on FIG. 3 of the drawings.

At a certain instant T the signal from the generator 16 resumes an exponential trend identical to V3, since from this instant T, generator 16 to deliver an exponential increasing more slowly than the wheel speed signal and which was previously inhibited by diode 52. The voltage at the terminals of the diode 52 falls below the voltage drop in this diode. The third phase begins at the instant T at which the value and gradient of the signal V4 are identical to those of the signal V3 at an instant T-dT, as shown in FIG. 2, and during this third phase the value of the signal V4 at each instant t is the one which the signal V3 possessed at the instant $t$-dT. From the instant T, the voltage between the terminals 112, 114 of the comparator 110 decreases, until the instant $t2$ where it reaches a zero value at which the comparator 110 changes over to its "low" level, so causing the end of relief and the beginning of the reapplication of pressure to the brakes. The changeover of the comparator 110 to a "low" level causes the transistor 80 to switch off, so rendering the transistor 70 and therefore the transistor 100 conductive. The transistor 104 also becomes conductive again, and the apparatus has returned to its initial condition.

Figure 3:
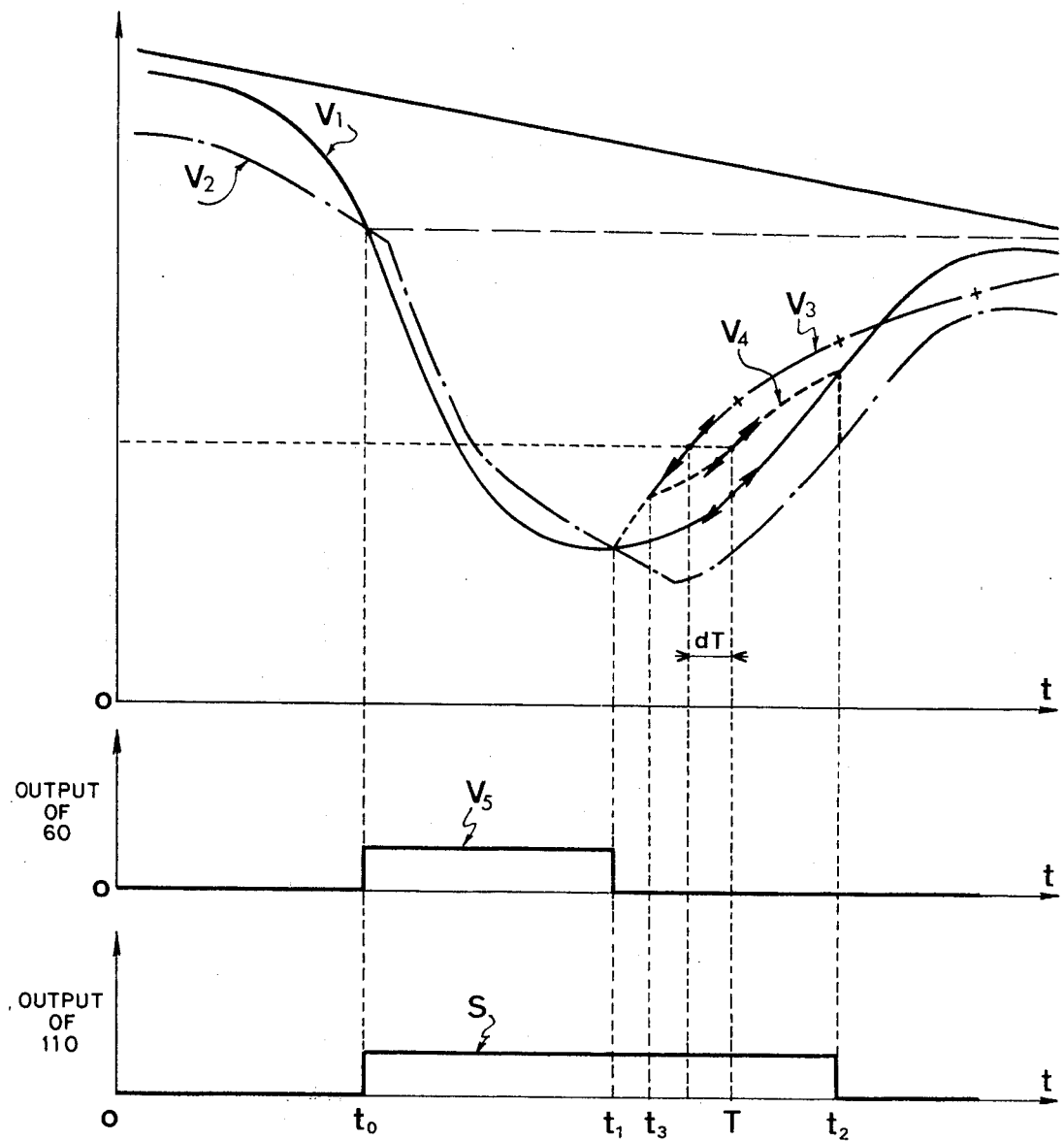
FIG. 3 is a graph representing variations in various voltages illustrating operation of the adaptive braking system according to the invention.

With reference to the graph illustrated in FIG. 3, V1 is the wheel speed signal, V2 is the speed reference signal, V3 is the exponential base signal, V4 is the signal produced by the generator 16 during an antiskid cycle, V5 is the voltage at the output of the comparator 60, and S is the voltage at the output of the comparator 110.

The instant $t2$ at which relief ends thus corresponds to the abscissa at the point of intersection between the curve V4 and the curve V1.

Various modifications may of course be made by those skilled in the art to the embodiment just described by way of example only.

It should be noted that the voltage offset controlled by the diode 52 in the embodiment described, may be controlled by any other similar device fulfilling the same function, without departing from the scope of the invention.

Moreover, any other wheel speed signal generator or speed reference voltage generator could be used, as well as the exponential generator could be replaced with some other suitable generator (for example a linear or parabolic generator).

What we claim is:

1. An electronic antiskid braking control unit for a braking system of a vehicle for delivering signals adapted to control modulation of the braking pressure in at least one brake actuator of a monitored wheel of the vehicle, said control unit comprising means for supplying a wheel speed voltage whose level is representative of the rotational speed of the monitored wheel, means for supplying a wheel speed reference voltage derived from said wheel speed voltage, comparing means having a first and a second input said first input receiving said wheel speed voltage, said comparing means generating a signal for controlling the decay of pressure in the brake actuator when the signals applied at the first and second inputs of the comparing means bear a predetermined relationship, means for generating a further voltage signal comprising first, second and third portions, said first portion coinciding with a base signal as long as the difference between the base signal and the wheel speed signal is less than a predetermined value, said second portion being offset with said wheel speed signal by said predetermined value and terminated when predetermined condition is reached, said third portion being delayed by a predetermined amount with respect to said base signal, said third portion being terminated when the value of the latter becomes equal to the value of the wheel speed voltage, switching means for normally applying said wheel speed reference voltage to said second input of the comparing means, said wheel speed reference voltage at said second input being overridden by the first, second and third portions of said further voltage signal when the latter are generated.

2. An electronic antiskid braking control unit according to claim 1, wherein said first, second and third sections are adjacent said first section and wherein the first section is initiated at the instant the wheel speed reference voltage becomes less than the wheel speed voltage.

3. An electronic antiskid braking control unit according to claim 2, wherein the initial value of the first section is equal to the instantaneous value of the wheel speed signal.

4. An electronic antiskid braking control unit according to claim 1 wherein the base signal is an exponential.

5. An electronic antiskid braking control unit according to claim 4, wherein the exponential base signal has an asymptotic value equal to the value of the wheel speed reference signal at the beginning of the signal for controlling the decay in pressure in the brake actuators.

6. An electronic antiskid braking control unit according to claim 5, wherein the asymptotic value is stored in a memory element, said memory element being normally supplied by the wheel speed reference signal by way of a normally open switching element, said switching element being adapted to be closed in response to generation of the signal for controlling the decay in pressure in the brake actuators, thereby storing the instant value of the wheel speed reference signal.

7. An electronic antiskid braking control unit according to claim 1, wherein at least one diode is adapted to prevent said further voltage signal from exceeding said wheel speed signal by more than a predetermined amount, said predetermined amount being determined by the voltage drop in said at least one diode and corresponding to the predetermined value of the offset between the second portion and the wheel speed signal.

8. An electronic antiskid braking control unit according to claim 1 wherein the switching means are responsive to a signal resulting from comparison of the wheel speed voltage with the wheel speed reference voltage for substituting said further signal for the wheel speed reference signal when the wheel speed reference voltage becomes less than said wheel speed voltage.

9. An electronic antiskid braking control unit according to claim 8, wherein the switching means are responsive to the signal for controlling decay of the braking pressure for substituting for said second input the wheel speed reference signal for said further signal when said further signal becomes again equal to said wheel speed signal.

10. An electronic antiskid braking control unit according to claim 9 wherein the means for generating said further signal are comprised of an amplifier whose input is connected to a storage capacitor for storing the asymptotic value of an exponential, and whose output is connected to the second input of the comparing means by way of a resistance capacitor network, the capacitor in the resistance-capacitor network tending to charge to the asymptotic value as long as said further signal has a value greater than said wheel speed signal.

11. An electronic antiskid braking control unit according to claim 8, wherein said switching means comprise an OR gate having two inputs one of which receiving the signal resulting from comparison of the wheel speed voltage with the wheel speed reference voltage, and the other input receiving a signal representative of the logical level of the relief signal, the output of the OR gate being connected to a control electrode of a transistor whose emitter-collector circuit is arranged in series between the output of the means for supplying a wheel speed reference voltage and the second input of said means for generating a signal for controlling decay of pressure, said transistor being nonconductive when the decay signal is generated and the wheel speed reference signal is below the wheel speed signal.

12. An electronic braking control unit according to claim 1, wherein said second portion of said further signal terminates when the rate of change of said second portion of said further signal is equal to the rate of change of said base signal when the value of the velocity represented by the base signal equals the value of the velocity represented by the second portion of the further signal.

* * * * *